(12) United States Patent
Van Nee et al.

(10) Patent No.: US 8,719,684 B2
(45) Date of Patent: May 6, 2014

(54) GUARD INTERVAL SIGNALING FOR DATA SYMBOL NUMBER DETERMINATION

(75) Inventors: Didier Johannes Richard Van Nee, De Meern (NL); Geert Arnout Awater, Utrecht (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/221,604

(22) Filed: Aug. 30, 2011

(65) Prior Publication Data
US 2012/0054587 A1 Mar. 1, 2012

Related U.S. Application Data

(60) Provisional application No. 61/378,642, filed on Aug. 31, 2010.

(51) Int. Cl.
*G06F 11/10* (2006.01)

(52) U.S. Cl.
USPC .............................. 714/807; 714/777; 714/784

(58) Field of Classification Search
USPC .......... 714/807, 777, 779, 784, 793, 798, 811, 714/786, 790, 755
See application file for complete search history.

(56) References Cited

U.S. PATENT DOCUMENTS

| | | | |
|---|---|---|---|
| 4,335,458 A * | 6/1982 | Krol | 714/763 |
| 6,212,660 B1 * | 4/2001 | Joeressen et al. | 714/758 |
| 6,263,466 B1 * | 7/2001 | Hinedi et al. | 714/755 |
| 7,110,349 B2 * | 9/2006 | Branlund et al. | 370/203 |
| 7,480,235 B2 | 1/2009 | Fujii et al. | |
| 7,684,445 B2 | 3/2010 | Wang | |
| 7,890,840 B2 * | 2/2011 | Khermosh et al. | 714/777 |
| 7,894,328 B2 | 2/2011 | Zhao | |
| 2009/0316812 A1 | 12/2009 | Sahara | |
| 2011/0026617 A1 | 2/2011 | Lee et al. | |

FOREIGN PATENT DOCUMENTS

WO    WO 03077457 A1    9/2003

OTHER PUBLICATIONS

International Search Report and Written Opinion—PCT/US2011/050049—ISA/EPO—Dec. 23, 2011.
Lanante L, et al., "IEEE802.11ac Preamble with Legacy 802.11a/n Backward Compatibility", IEEE 802.11-YY/0847R0, [Online] Jul. 14, 2009, pp. 1-18, XP002606794, Retrieved from the Internet: URL:http://www.google.de/url?sa=t&source=web&cd=3 &ved=0CBgQFjAC&url=https%3A%2F%2Fmentor.ieee.org%2F802.11%2Fdcn%2F10%2F11-10-0791-02-00ac-pha se-rotation-for-the-80-mhz-802-11ac-mixed-mode-packet.ppt &ei=u3bFT07TE8qh4QbZko26Aw &usg=AFQjCNHYIiVI8HNnsZmesHd33saVGqWpOw> [retrieved on Oct. 25, 2010] pp. 3-12.
Kim Y. et al., "VHT Packet Duration Signaling", IEEE 802.11-10/0772r0, Jul. 12, 2010, URL: https://mentor.ieee.org/802.11/dcn/10/11-10-0772-00-00ac-vht-packet-duration-signaling.ppt.

\* cited by examiner

*Primary Examiner* — Fritz Alphonse
(74) *Attorney, Agent, or Firm* — Patterson & Sheridan, LLP

(57) ABSTRACT

Certain aspects of the present disclosure generally relate to wireless communications and, more particularly, to techniques for accurately determining a number of data symbols in a data packet. The techniques provided herein may allow a receiving terminal to correct number of symbol calculations based on such ambiguous length field values.

34 Claims, 9 Drawing Sheets

700

| L-SIG LENGTH (assuming 1 VHT-LTF) |||||
|---|---|---|---|---|
| $N_{SYM}$ | LONG GI (T = 4us) || SHORT GI (T = 3.6us) ||
| | TXTIME | LENGTH | TXTIME | LENGTH |
| 18 | 112 | 66 | 104.8 | 63 |
| 19 | 116 | 69 | 108.4 | 66 |
| 20 | 120 | 72 | 112 | 66 |

| GI/LENGTH CORRECTION BITS |||
|---|---|---|
| $N_{SYM}$ % 10 == 9 ? | ASSUME '01' RESERVED ||
| | LONG GI | SHORT GI |
| YES | 00 | 11 |
| NO | 00 | 10 |

FIG. 8

GUARD INTERVAL SIGNALING FOR DATA SYMBOL NUMBER DETERMINATION

CROSS-REFERENCE TO RELATED APPLICATIONS

This application claims benefit of U.S. Provisional Patent Application Ser. No. 61/378,642 entitled, "GUARD INTERVAL SIGNALING FOR DATA SYMBOL NUMBER DETERMINATION", filed Aug. 31, 2010, which is herein incorporated by reference.

BACKGROUND

1. Field

Certain aspects of the present disclosure generally relate to wireless communications and, more particularly, to techniques for accurately determining a number of data symbols in a data packet.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide a method for wireless communications. The method generally includes generating a data packet comprising one or more data symbols, providing, in a preamble field of the data packet, a length field that may be used to calculate a number of symbols by a receiving entity, as well as correction field the provides an indication of whether or not the calculated number of symbols should be corrected, and transmitting the data packet.

Certain aspects of the present disclosure provide a method for wireless communications. The method generally includes receiving a data packet comprising one or more data symbols, extracting a length field and a correction field from the data packet, and calculating a number of data symbols in the packet, based on the length field and the correction field.

Certain aspects of the present disclosure provide an apparatus for wireless communications. The apparatus generally includes means for generating a data packet comprising one or more data symbols, means for providing, in a preamble field of the data packet, a length field that may be used to calculate a number of symbols by a receiving entity, as well as correction field the provides an indication of whether or not the calculated number of symbols should be corrected, and means for transmitting the data packet.

Certain aspects of the present disclosure provide an apparatus for wireless communications. The apparatus generally includes means for receiving a data packet comprising one or more data symbols, means for extracting a length field and a correction field from the data packet, and means for calculating a number of data symbols in the packet, based on the length field and the correction field.

Certain aspects of the present disclosure provide an apparatus for wireless communications. The apparatus generally includes at least one processor configured to generate a data packet comprising one or more data symbols, provide, providing, in a preamble field of the data packet, a length field that may be used to calculate a number of data symbols by a receiving entity and a correction field that indicates whether or not the calculated number of symbols should be corrected, and transmit the data packet and a receiving entity may calculate a number of data symbols based on the Length field and the correction field; and a memory coupled with the at least one processor.

Certain aspects of the present disclosure provide an apparatus for wireless communications. The apparatus generally includes at least one processor configured to receive a data packet comprising one or more data symbols, extract a length field and a correction field from the data packet, and calculate a number of data symbols in the packet, based on the length field and the correction field; and a memory coupled with the at least one processor.

Certain aspects of the present disclosure provide a computer-program product comprising a computer-readable medium having instructions stored thereon. The instructions are generally executable by one or more processors for generating a data packet comprising one or more data symbols, providing, in a preamble field of the data packet, a length field that may be used to calculate a number of data symbols by a receiving entity and a correction field that indicates whether or not the calculated number of symbols should be corrected, and transmitting the data packet.

Certain aspects of the present disclosure provide a computer-program product comprising a computer-readable medium having instructions stored thereon. The instructions are generally executable by one or more processors for receiving a data packet comprising one or more data symbols, extracting a length field and a correction field from the data packet, and calculating a number of data symbols in the packet, based on the length field and the correction field.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates an example of an ambiguous length field that may be corrected, in accordance with certain aspects of the present disclosure.

FIG. 8 illustrates an example of a correction field that may be provided to correct a number of data symbols calculated based on an ambiguous length field, in accordance with certain aspects of the present disclosure.

DETAILED DESCRIPTION

Figure 1:
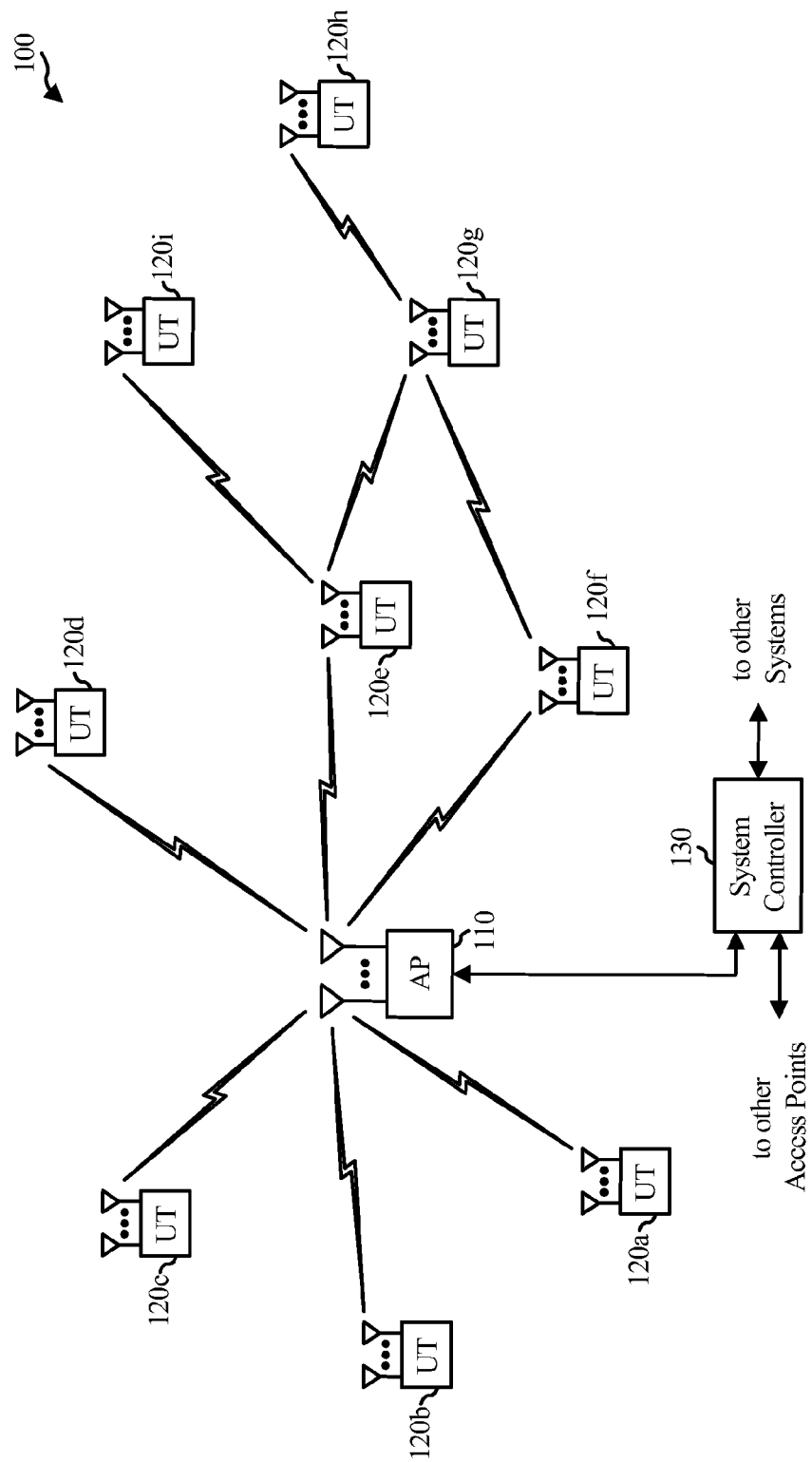
FIG. 1 illustrates a diagram of a wireless communications network in accordance with certain aspects of the present disclosure.

Aspects of the present disclosure provide techniques that may be used to help resolve ambiguities in a data packet length field. The ambiguities may arise when data symbols utilize short guard intervals (GIs). Data symbols with these short GIs have a transmission time that is less than a resolution of a length field provided in the data packet, which may result in the same length field value being calculated for different numbers of symbols. The techniques provided herein may allow a receiving terminal to correct number of symbol calculations based on such ambiguous length field values.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
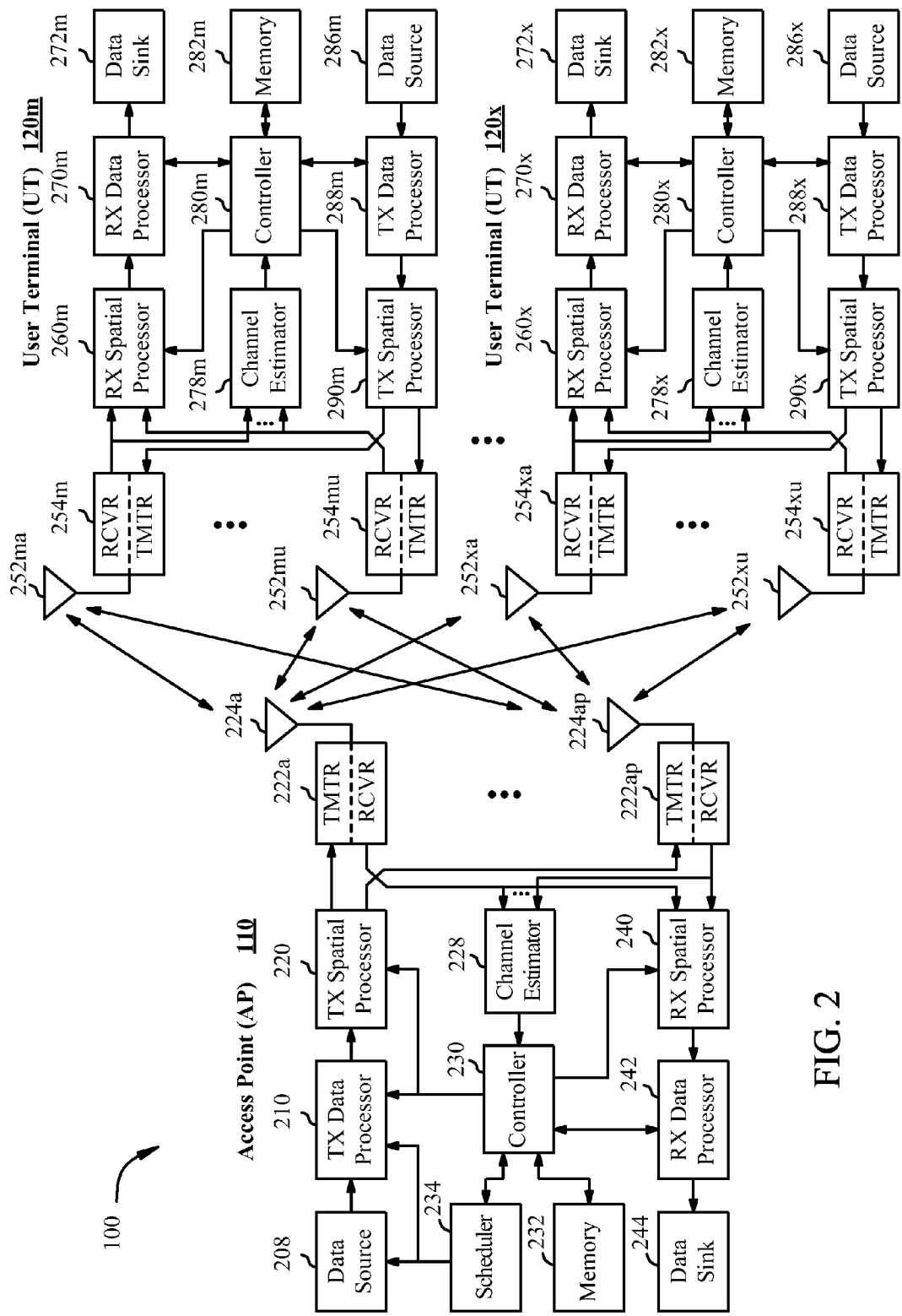
FIG. 2 illustrates a block diagram of an example access point and user terminals in accordance with certain aspects of the present disclosure.

FIG. 2 illustrates a block diagram of access point 110 and two user terminals 120m and 120x in the MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
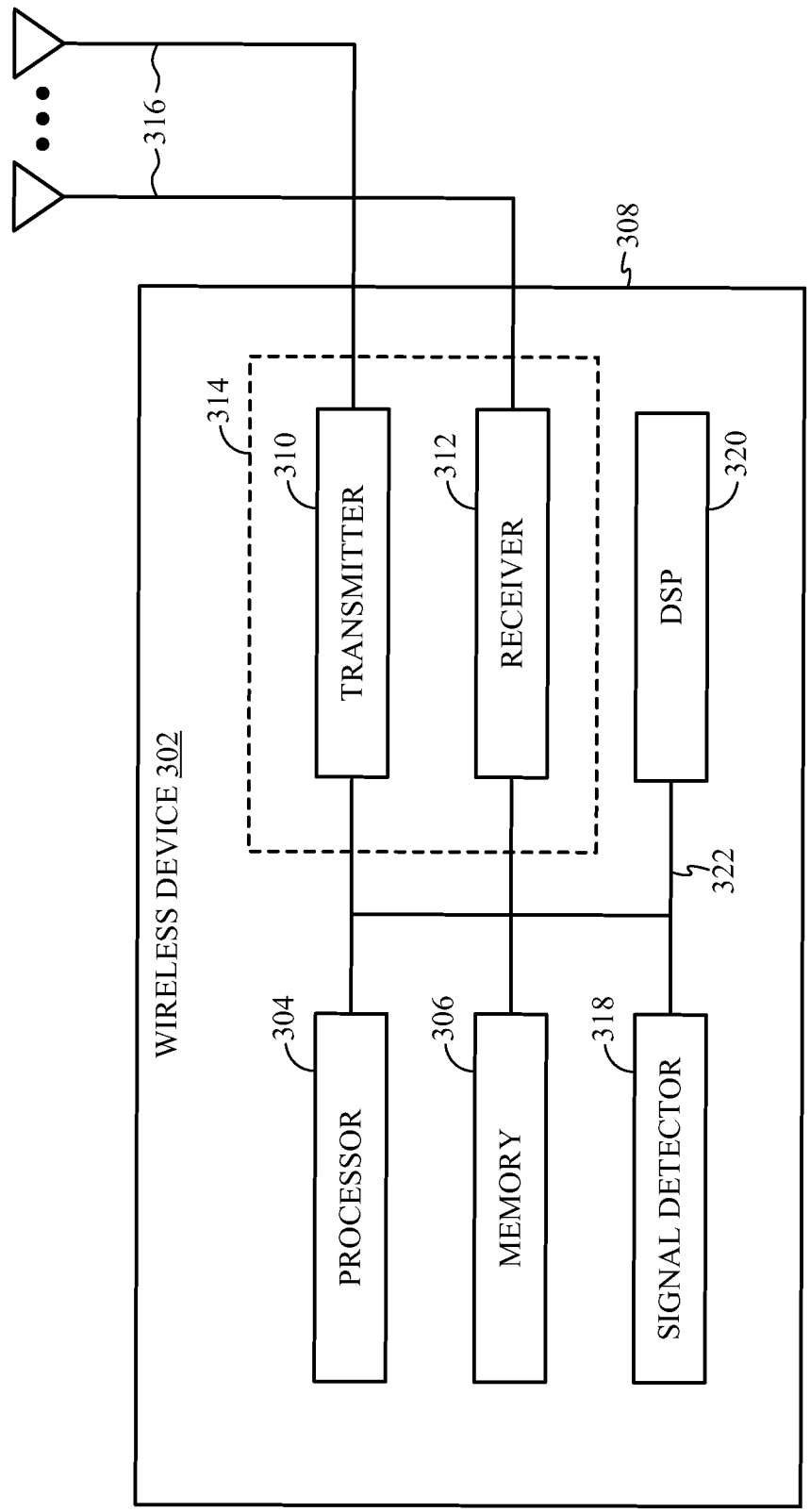
FIG. 3 illustrates a block diagram of an example wireless device in accordance with certain aspects of the present disclosure.

FIG. 3 illustrates various components that may be utilized in a wireless device 302 that may be employed within a wireless communication system, such as the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
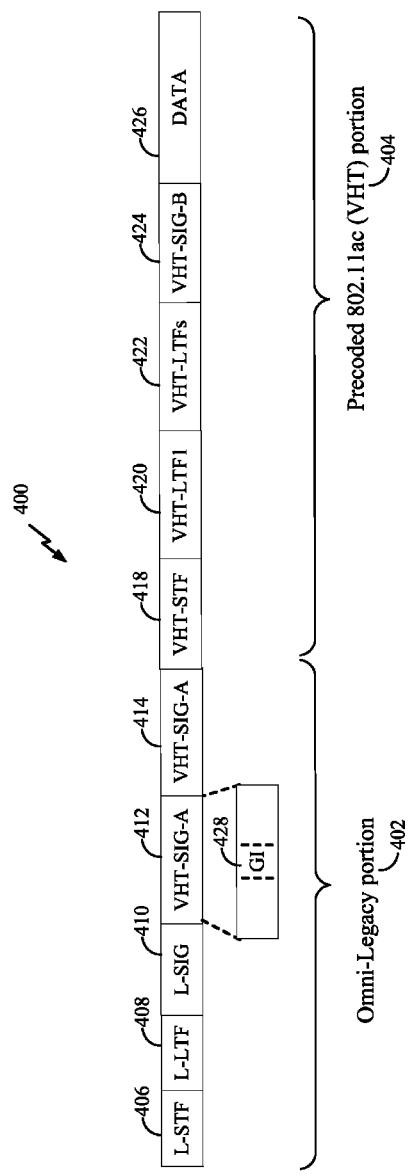
FIG. 4 illustrates an example structure of preamble transmitted from an access point in accordance with certain aspects of the present disclosure.

FIG. 4 illustrates an example structure of a preamble 400 in accordance with certain aspects of the present disclosure. The preamble 400 may be transmitted, for example, from the access point (AP) 110 to the user terminals 120 in the MIMO system 100 illustrated in FIG. 1.

The preamble 400 may comprise an omni-legacy portion 402 (i.e., the non-beamformed portion) and a precoded IEEE 802.11ac VHT (Very High Throughput) portion 404. The legacy portion 402 may comprise: a Legacy Short Training Field (L-STF) 406, a Legacy Long Training Field 408, a Legacy Signal (L-SIG) field 410, and two OFDM symbols for VHT Signal A (VHT-SIG-A) fields 412, 414. The VHT-SIG-A fields 412, 414 (i.e., VHT-SIG-A1 and VHT-SIG-A2) may be transmitted omni-directionally and may indicate allocation of numbers of spatial streams to a combination (set) of STAs.

The precoded IEEE 802.11ac VHT portion 404 may comprise a VHT Short Training Field (VHT-STF) 418, a VHT Long Training Field 1 (VHT-LTF1) 420, VHT Long Training Fields (VHT-LTFs) 422, a VHT Signal B (VHT-SIG-B) field 424, and a data portion 426. The VHT-SIG-B field may comprise one OFDM symbol and may be transmitted precoded/beamformed.

Robust MU-MIMO reception may involve the AP transmitting all VHT-LTFs 422 to all supported STAs. The VHT-LTFs 422 may allow each STA to estimate a MIMO channel from all AP antennas to the STA's antennas. The STA may utilize the estimated channel to perform effective interference nulling from MU-MIMO streams corresponding to other STAs. To perform robust interference cancellation, each STA may be expected to know which spatial stream belongs to that STA, and which spatial streams belong to other users.

Guard Interval Signaling for Data Symbol Number Determination

The L-SIG field 410 may have a Length field that is indicates a packet duration as an integer number of symbols. For example, the L-SIG Length field may indicate packet duration as an integer number of 4 us symbols. A receiving station may utilize the L-SIG Length field to determine the number of data symbols in a packet, in accordance with an equation described in greater detail below.

In general, 802.11ac packets do not have a byte length field in VHT-SIG-A. Rather, the L-SIG LENGTH field contains a duration like in 802.11n Mixed-Mode, which gives the packet duration as an integer number of 4 microsecond (corresponding to 802.11a symbols). As a result, If a short guard interval is used, there may be an ambiguity in the L-SIG LENGTH.

For example, different packets with x and x−1 symbols, may both have the same L-SIG LENGTH. This ambiguity may only exist, however, for a number of short guard interval symbols equal to 10n or 10n−1 where n is an integer. The ambiguity is due to the nature of the equation used to calculate the L-SIG LENGTH field, which includes a ceiling function. As will be described in greater detail below, for a data packet with 1 VHT-LTF, data packets with 20 and 19 short GI symbols have the same L-SIG LENGTH value.

However, as described above, ambiguities may arise when data symbols utilize short guard intervals (GIs) with transmission times less than 4 us, such as symbols with short GIs with transmission times of 3.6 us. Because, in this case, data packets with different numbers of symbols ($N_{SYM}$) may be transmitted with the same Length value, a receiving entity may determine an incorrect number of data symbols.

According to certain aspects, to allow a receiving entity to resolve this ambiguity, a transmitting entity may transmit a field that indicates a length of the GI used for data symbols and/or may also indicate whether or not a number of symbols calculated based on an ambiguous Length field should be corrected.

As illustrated in FIG. 4, such a field may be transmitted in the form of a multi-bit GI field 428. The GI field 428 may be included in the VHT-SIG-A field 412. As will be described in greater detail below, the multi-bit code of the GI field 428 may indicate whether a long or short GI field is used in data symbols and, in the case of data symbols with short GI, the GI field may also indicate whether the number of symbols calculated based on the length field should be corrected.

Figure 5:
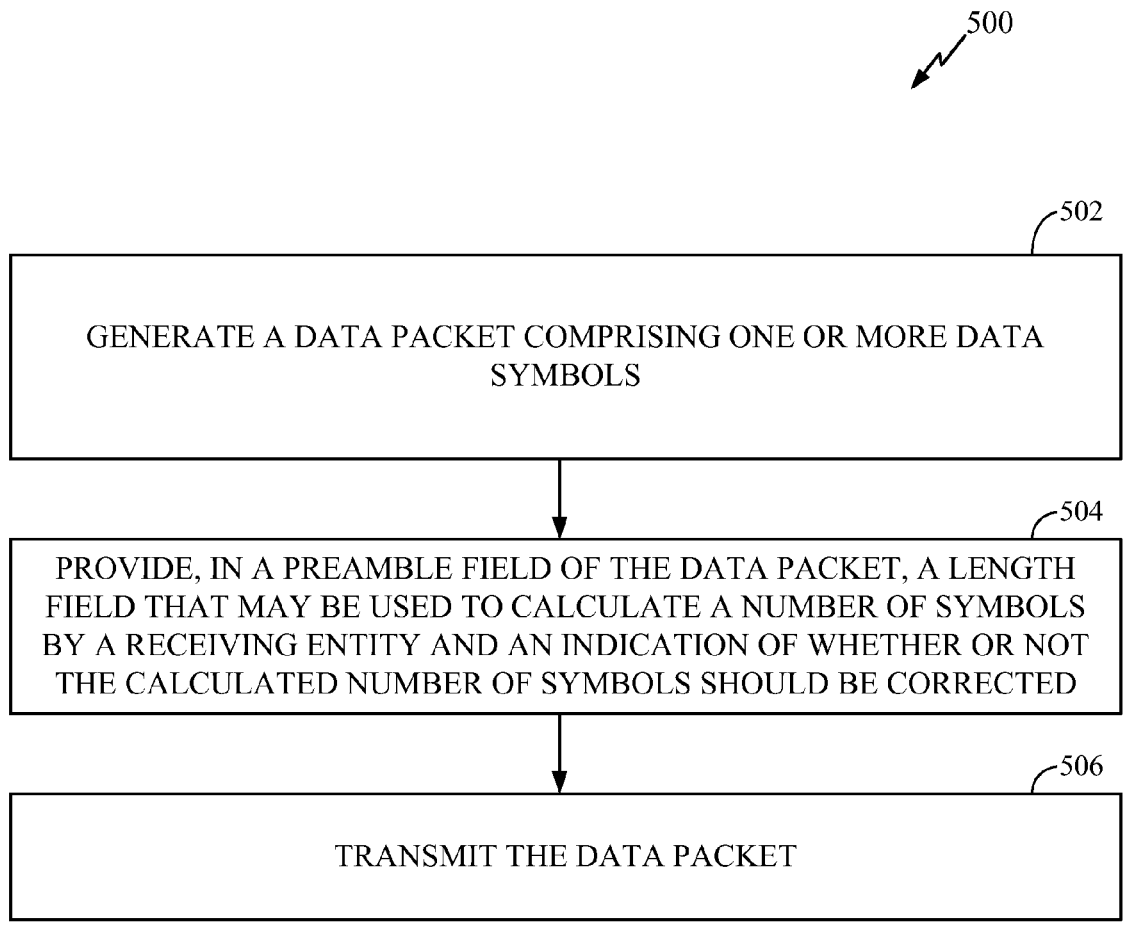
FIG. 5 illustrates example operations that may be performed at an access point (AP) to provide a correction factor for an ambiguous length field, in accordance with certain aspects of the present disclosure.

FIG. 5 illustrates example operations that may be performed at an access point (AP) to generate and provide a correction factor for an ambiguous length field, in accordance with certain aspects of the present disclosure.

The operations 500 begin, at 502, by generating a data packet comprising one or more data symbols. At 504, the AP provides, in a preamble field of the data packet, a length field that may be used to calculate a number of symbols by a receiving entity, as well as an indication of whether or not the calculated number of symbols should be corrected. At 506, the AP may transmit the data packet and a receiving entity may calculate a number of data symbols based on the Length field and the indication.

Figure 6:
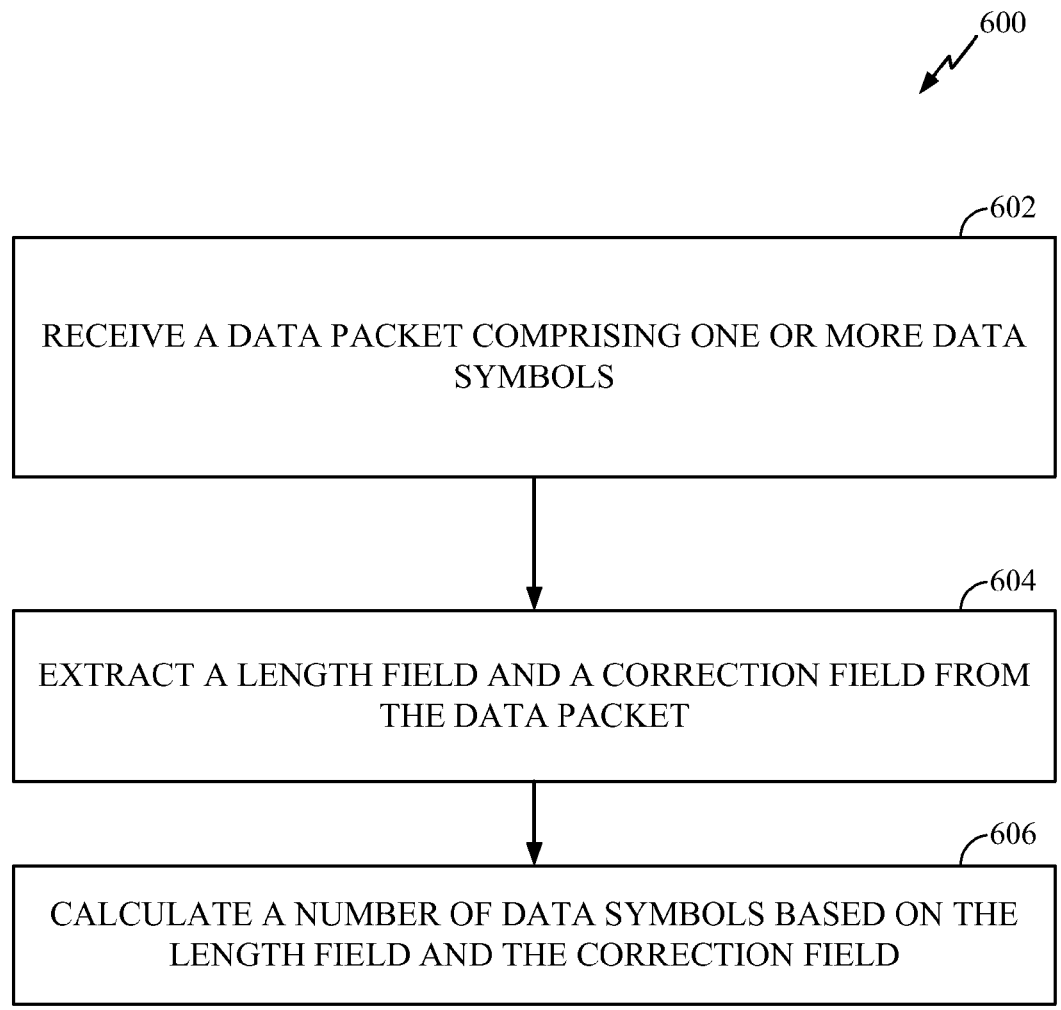
FIG. 6 illustrates example operations that may be performed at a user terminal to correct a number of data symbols calculated based on an ambiguous length field, in accordance with certain aspects of the present disclosure.

FIG. 6 illustrates example operations 600 that may be performed, for example, at a user terminal to correct a number of data symbols calculated based on an ambiguous length field, in accordance with certain aspects of the present disclosure.

The operations begin, at 602, by receiving a data packet comprising one or more data symbols. At 604, the UT extracts a length field and a correction field from the data packet. At 606, the UT calculates a number of data symbols in the packet, based on the length field and the correction field.

FIG. 7 shows a table 700 of Length values for various packet configurations. The values illustrate the example, alluded to above, of an ambiguous length field value for data packets with 20 and 19 short GI symbols.

The values in the table 700 assume a data packet with 1 VHT-LTF. As shown for long GI symbols, there is no ambiguity as each different number of symbols ($N_{SYM}$), results in a different L-SIG LENGTH value. On the other hand, for short GI symbols, data packets with 20 and 19 short GI symbols have the same L-SIG LENGTH value.

The reason for the ambiguity may be seen by examining the equation used to calculate the length value:

$$LENGTH = \text{ceil}((TXTIME-20)/4) \times 3 - 3 \quad (1)$$

where $$TXTIME = 36 + 4N_{VHT\text{-}LTF} + N_{SYM}T \quad (2)$$

where T is 4 or 3.6 microseconds depending on the guard interval (4 for long, 3.6 for short), $N_{SYM}$ is number of DATA symbols (does not include VHT-SIG-B), and $36+4N_{VHT\text{-}LTF}$ is duration of preamble in microseconds. This may include VHT-SIG-B which always uses a long guard interval.

In the equation for L-SIG LENGTH, above, "ceil" is the ceiling function. Because "ceil(x)" is defined as "the smallest integer not less than x." Because the argument of the ceiling function in the equation above has a divisor of 4 and, for short GI symbols, TXTIMEs for consecutive NSYM values will differ by less than four, the argument of the ceiling function will differ by less than one. Thus, in the event the argument does not result in different integer values, the L-SIG LENGTH values will be the same, as with $N_{SYM}=19$ and 20.

FIG. 8 illustrates example values for a GI correction field that may be provided to correct a number of data symbols calculated based on an ambiguous length field, in accordance with certain aspects of the present disclosure. As discussed above, aspects of the present disclosure may help resolve this ambiguity by making the GI field described above dependent on the number of data symbols and, on the receiver side, corresponding different equations may be used to calculate $N_{SYM}$, with the equation selected based on the GI bit values. While not shown, the value "b01" may be s reserved value.

While the LENGTH equation (1) above may be used most of the time, if short GI is used and the number of symbols modulo 10 is 9 ($N_{SYM} \% 10 = 9$), different equations may be used, to calculate $N_{SYM}$. For example, for GI=b00, the following equation may be used (based on EQ (1) above):

$$N_{SYM} = \text{ceil}((LENGTH+3)/3) - 4 - N_{VHT\text{-}LTF} \quad (3)$$

for b10:

$$N_{SYM} = \text{floor}((\text{ceil}((LENGTH+3)/3) - 4 - N_{VHT\text{-}LTF})*4/3.6) \quad (4)$$

and for b'11'

$$N_{SYM} = \text{floor}((\text{ceil}((LENGTH+3)/3) - 4 - N_{VHT\text{-}LTF})*4/3.6) - 1 \quad (5)$$

Thus, even if an ambiguous LENGTH value is transmitted, the ambiguity may be resolved by using the correct $N_{SYM}$ equation based on the GI field.

Figure 5A:
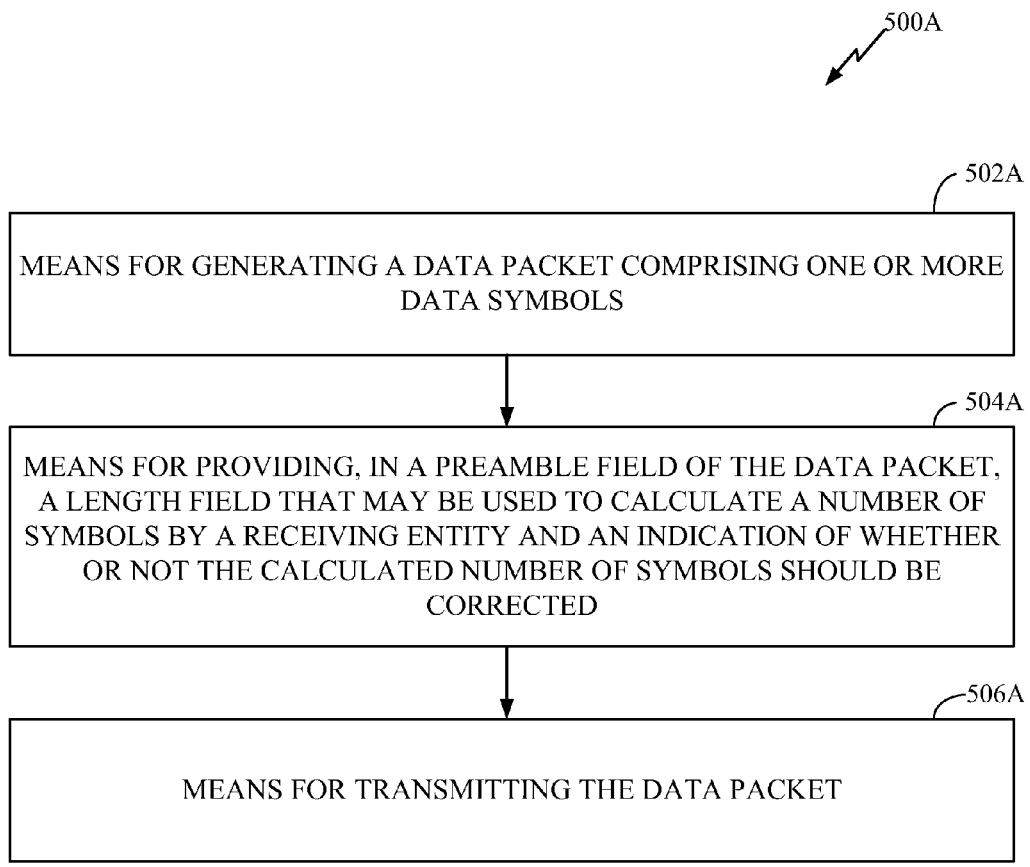
FIG. 5A illustrates example means capable of performing the operations shown in FIG. 5.
Figure 6A:
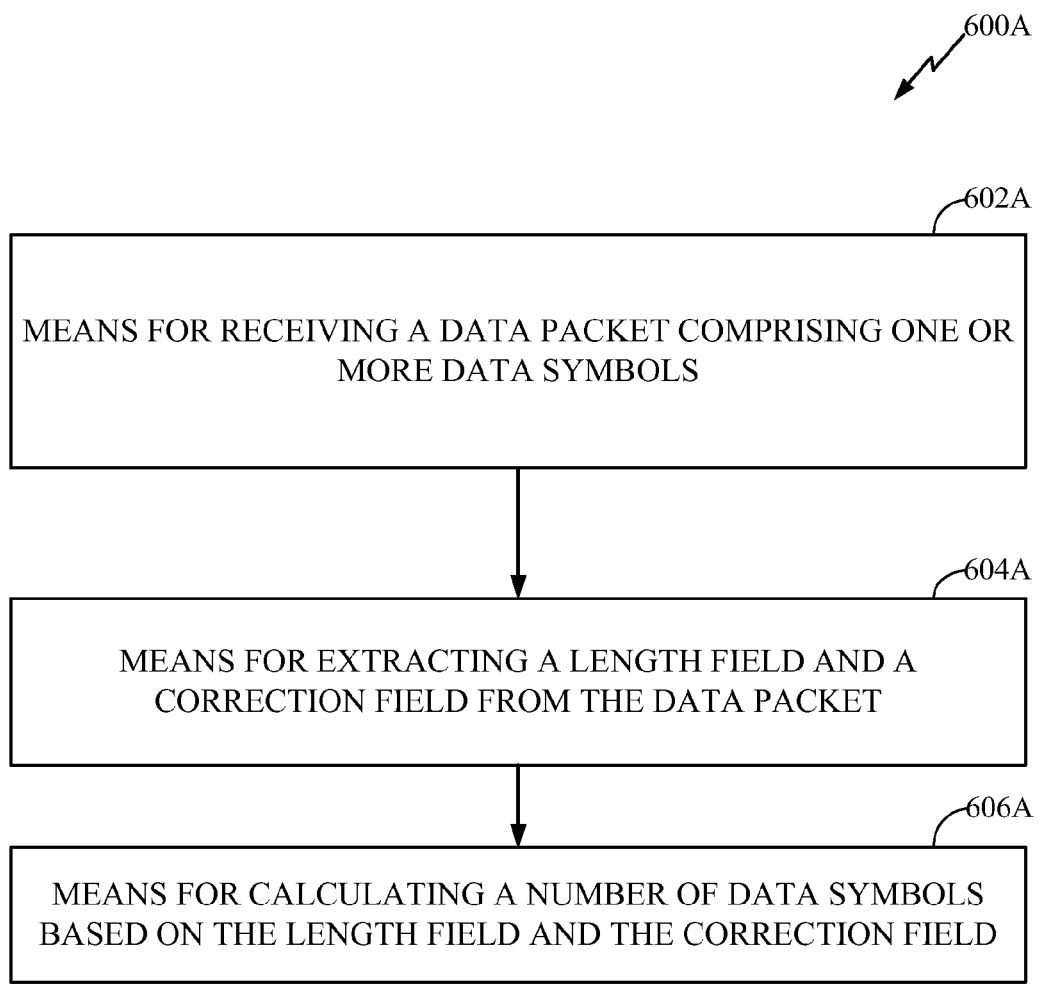
FIG. 6A illustrates example means capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 and 600 illustrated in FIGS. 5 and 6 correspond to means 500A and 600A illustrated in FIGS. 5A and 6A.

For example, means for transmitting may comprise a transmitter (e.g., the transmitter unit 222) and/or an antenna 224 of the access point 110 illustrated in FIG. 2. Means for receiving may comprise a receiver (e.g., the receiver unit 254) and/or an antenna 252 of the user terminal 120 illustrated in FIG. 2. Means for processing, means for determining, or means for using may comprise a processing system, which may include one or more processors, such as the RX data processor 270, the TX data processor 288, and/or the controller 280 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications, comprising:
generating, by an access point, a data packet comprising one or more data symbols;
providing, in a preamble field of the data packet, a length field used to calculate a number of data symbols by a receiving entity and a correction field that indicates whether or not the calculated number of symbols should be corrected; and
transmitting the data packet.

2. The method of claim 1, wherein the providing comprises:
providing a first value for the correction field if a guard interval of a first length is used and a first number of data symbols are transmitted in the packet; and
providing a second value for the correction field if the guard interval of a first length is used and a second number of data symbols are transmitted in the packet.

3. The method of claim 2, wherein:
the first value is provided for the correction field if the number of symbols, $N_{SYM}$, modulo 10 is equal to 9; and
the second value is provided otherwise.

4. The method of claim 1, wherein the correction field comprises a 2-bit field.

5. The method of claim 4, wherein the 2-bit field indicates whether the data symbols have a long or short guard interval.

6. The method of claim 5, wherein a same value for the 2-bit field is used regardless of the number of data symbols, if the data symbols have a long guard interval (GI).

7. A method for wireless communications, comprising:
receiving, by user terminal, a data packet comprising one or more data symbols;
extracting a length field and a correction field from the data packet; and
calculating a number of data symbols in the packet, based on the length field and the correction field.

8. The method of claim 7, wherein:
the correction field has a first value if a guard interval of a first length is used and a first number of data symbols are transmitted in the packet; and
the correction field has a second value if the guard interval of a first length is used and a second number of data symbols are transmitted in the packet.

9. The method of claim 8, wherein:
the first value is provided for the correction field if the number of symbols, $N_{SYM}$, modulo 10 is equal to 9; and
the second value is provided otherwise.

10. The method of claim 7, wherein the correction field comprises a 2-bit field.

11. The method of claim 10, wherein the 2-bit field indicates whether the data symbols have a long or short guard interval.

12. The method of claim 11, wherein a same value for the 2-bit field is used regardless of the number of data symbols, if the data symbols have a long guard interval (GI).

13. The method of claim 7, wherein calculating the number of data symbols in the packet, based on the length field and the correction field, comprises selecting an equation for use in calculating the number of data symbols, based on the value of the correction field.

14. An apparatus for wireless communications, comprising:
means for generating a data packet comprising one or more data symbols;
means for providing, in a preamble field of the data packet, a length field used to calculate a number of data symbols by a receiving entity and a correction field that indicates whether or not the calculated number of symbols should be corrected; and
means for transmitting the data packet.

15. The apparatus of claim 14, wherein the means for providing comprises:
means for providing a first value for the correction field if a guard interval of a first length is used and a first number of data symbols are transmitted in the packet; and
means for providing a second value for the correction field if the guard interval of a first length is used and a second number of data symbols are transmitted in the packet.

16. The apparatus of claim 15, wherein:
the first value is provided for the correction field if the number of symbols, $N_{SYM}$, modulo 10 is equal to 9; and
the second value is provided otherwise.

17. The apparatus of claim 14, wherein the correction field comprises a 2-bit field.

18. The apparatus of claim 17, wherein the 2-bit field indicates whether the data symbols have a long or short guard interval.

19. The apparatus of claim 18, wherein a same value for the 2-bit field is used regardless of the number of data symbols, if the data symbols have a long guard interval (GI).

20. An apparatus for wireless communications, comprising:
means for receiving a data packet comprising one or more data symbols;
means for extracting a length field and a correction field from the data packet; and
means for calculating a number of data symbols in the packet, based on the length field and the correction field.

21. The apparatus of claim 20, wherein:
the correction field has a first value if a guard interval of a first length is used and a first number of data symbols are transmitted in the packet; and
the correction field has a second value if the guard interval of a first length is used and a second number of data symbols are transmitted in the packet.

22. The apparatus of claim 21, wherein:
the first value is provided for the correction field if the number of symbols, $N_{SYM}$, modulo 10 is equal to 9; and
the second value is provided otherwise.

23. The apparatus of claim 20, wherein the correction field comprises a 2-bit field.

24. The apparatus of claim 23, wherein the 2-bit field indicates whether the data symbols have a long or short guard interval.

25. The apparatus of claim 24, wherein a same value for the 2-bit field is used regardless of the number of data symbols, if the data symbols have a long guard interval (GI).

26. The apparatus of claim 20, wherein calculating the number of data symbols in the packet, based on the length field and the correction field, comprises selecting an equation for use in calculating the number of data symbols, based on the value of the correction field.

27. An apparatus for wireless communications, comprising:
at least one processor configured to generate a data packet comprising one or more data symbols, provide, providing, in a preamble field of the data packet, a length field that may be used to calculate a number of data symbols by a receiving entity and a correction field that indicates whether or not the calculated number of symbols should be corrected, and transmit the data packet; and
a memory coupled with the at least one processor.

28. An apparatus for wireless communications, comprising:
at least one processor configured to receive a data packet comprising one or more data symbols, extract a length field and a correction field from the data packet, and calculate a number of data symbols in the packet, based on the length field and the correction field; and
a memory coupled with the at least one processor.

29. A computer-program product comprising a non-transitory computer-readable medium having instructions stored thereon, the instructions executable by one or more processors for:
generating a data packet comprising one or more data symbols;
providing, in a preamble field of the data packet, a length field used to calculate a number of data symbols by a receiving entity and a correction field that indicates whether or not the calculated number of symbols should be corrected; and
transmitting the data packet.

30. A computer-program product comprising a non-transitory computer-readable medium having instructions stored thereon, the instructions executable by one or more processors for:
receiving a data packet comprising one or more data symbols;
extracting a length field and a correction field from the data packet; and
calculating a number of data symbols in the packet, based on the length field and the correction field.

31. A method for wireless communications, comprising:
receiving, by user terminal, a data packet comprising one or more data symbols;
extracting a length field (LENGTH) and a correction field from the data packet; and
calculating a number of data symbols ($N_{SYM}$) in the packet, based on the length field using one of expressions:

$$N_{SYM} = \text{ceil}((LENGTH+3)/3) - 4 - N_{VHT\text{-}LTF};$$

$$N_{SYM} = \text{floor}((\text{ceil}((LENGTH+3)/3) - 4 - N_{VHT\text{-}LTF})*4/3.6); \text{ and}$$

$$N_{SYM} = \text{floor}((\text{ceil}((LENGTH+3)/3) - 4 - N_{VHT\text{-}LTF})*4/3.6) - 1,$$

wherein $N_{VHT\text{-}LTF}$ is the number of Very High Throughput Long Training Fields and wherein the expression is selected based on the correction field.

32. An apparatus for wireless communications, comprising:
means for receiving, by user terminal, a data packet comprising one or more data symbols;
means for extracting a length field (LENGTH) and a correction field from the data packet; and
means for calculating a number of data symbols ($N_{SYM}$) in the packet, based on the length field and using one of expressions:

$$N_{SYM} = \text{ceil}((LENGTH+3)/3) - 4 - N_{VHT\text{-}LTF};$$

$$N_{SYM} = \text{floor}((\text{ceil}((LENGTH+3)/3) - 4 - N_{VHT\text{-}LTF})*4/3.6); \text{ and}$$

$$N_{SYM} = \text{floor}((\text{ceil}((LENGTH+3)/3) - 4 - N_{VHT\text{-}LTF})*4/3.6) - 1,$$

wherein $N_{VHT\text{-}LTF}$ is the number of Very High Throughput Long Training Fields and wherein the expression is selected based on the correction field.

33. An apparatus for wireless communications, comprising:
  at least one processor configured to:
    receive, by user terminal, a data packet comprising one or more data symbols;
    extract a length field (LENGTH) and a correction field from the data packet; and
    calculate a number of data symbols ($N_{SYM}$) in the packet, based on the length field and using one of expressions:

$$N_{SYM}=\text{ceil}((LENGTH+3)/3)-4-N_{VHT\text{-}LTF};$$

$$N_{SYM}=\text{floor}((\text{ceil}((LENGTH+3)/3)-4-N_{VHT\text{-}LTF})*4/3.6); \text{ and}$$

$$N_{SYM}=\text{floor}((\text{ceil}((LENGTH+3)/3)-4-N_{VHT\text{-}LTF})*4/3.6)-1,$$

wherein $N_{VHT\text{-}LTF}$ is the number of Very High Throughput Long Training Fields and wherein the expression is selected based on the correction field; and
  a memory coupled to the at least one processor.

34. A computer-program product comprising a non-transitory computer-readable medium having instructions stored thereon, the instructions executable by one or more processors for:
  receiving, by user terminal, a data packet comprising one or more data symbols;
  extracting a length field (LENGTH) and a correction field from the data packet; and
  calculating a number of data symbols ($N_{SYM}$) in the packet, based on the length field and using one of expressions:

$$N_{SYM}=\text{ceil}((LENGTH+3)/3)-4-N_{VHT\text{-}LTF};$$

$$N_{SYM}=\text{floor}((\text{ceil}((LENGTH+3)/3)-4-N_{VHT\text{-}LTF})*4/3.6); \text{ and}$$

$$N_{SYM}=\text{floor}((\text{ceil}((LENGTH+3)/3)-4-N_{VHT\text{-}LTF})*4/3.6)-1,$$

wherein $N_{VHT\text{-}LTF}$ is the number of Very High Throughput Long Training Fields and wherein the expression is selected based on the correction field.

* * * * *